United States Patent [19]
Arcella et al.

[11] Patent Number: 5,605,971
[45] Date of Patent: Feb. 25, 1997

[54] NEW FLUORINATED THERMOPLASTIC ELASTOMERS HAVING SUPERIOR MECHANICAL AND ELASTIC PROPERTIES, AND PREPARATION PROCESS THEREOF

[75] Inventors: Vincenzo Arcella, Novara; Giulio Brinati, Milan; Margherita Albano, Milan; Vito Tortelli, Milan, all of Italy

[73] Assignee: Ausimont S.p.A., Milan, Italy

[21] Appl. No.: 441,233

[22] Filed: May 15, 1995

[30] Foreign Application Priority Data

May 18, 1994 [IT] Italy ............ MI94A0997

[51] Int. Cl.$^6$ .......... C08F 259/00; C08F 14/16
[52] U.S. Cl. ........ 525/276; 525/331.2; 526/209; 526/247
[58] Field of Search ............ 526/209, 247; 525/276, 331

[56] References Cited

U.S. PATENT DOCUMENTS

| | | | |
|---|---|---|---|
| 2,515,628 | 7/1950 | Castle | 260/192 |
| 2,520,338 | 8/1950 | Robertson | 260/192 |
| 3,810,874 | 5/1974 | Mitsch et al. | 260/75 H |
| 3,865,845 | 2/1975 | Resnick | 260/340.9 |
| 3,978,030 | 8/1976 | Resnick | 526/247 |
| 4,158,678 | 6/1979 | Tatemoto et al. | 260/884 |
| 4,243,770 | 1/1981 | Tatemoto et al. | 525/331 |
| 4,864,006 | 9/1989 | Giannetti et al. | 526/209 |
| 5,173,553 | 12/1992 | Albano et al. | 526/238 |

FOREIGN PATENT DOCUMENTS

| | | |
|---|---|---|
| 0073087 | 3/1983 | European Pat. Off. |
| 0076581 | 4/1983 | European Pat. Off. |
| 0080187 | 6/1983 | European Pat. Off. |
| 0200908 | 12/1986 | European Pat. Off. |
| 0444700 | 9/1991 | European Pat. Off. |
| 0625526 | 11/1994 | European Pat. Off. |

OTHER PUBLICATIONS

Masato Yoshida et al, Recent Progress In Perfluoroalkylation By Radical Species With Special Reference To The Use Of Bis(Perfluoroalkanoyl Peroxide), *J. Fluorine Chemistry*, 49 (1990), pp. 1–20.

Wei–Huan Huang, Reactions With Aromatic And Heteraromatic Compounds (may be only a partial title), *J. Fluorine Chemistry*, 58 (1992), pp. 1–8.

V. Tortelli et al, Telomerization Of Tetrafluoroethylene And Hexafluoropropene: Synthesis Of Diiododperfluoroalkanes, *J. Fluorine Chemistry*, 47 (1990), PP. 199–217.

*Primary Examiner*—Irina Zemel
*Attorney, Agent, or Firm*—Watson Cole Stevens Davis, P.L.L.C.

[57] ABSTRACT

Fluorinated thermoplastic elastomers comprising monomeric units deriving from at least an iodinated olefin of formula:

$$CX_2=CX-R_f-CHR-I \qquad (I)$$

wherein:

X is —H, —F, or —CH$_3$; R is —H or —CH$_3$; R$_f$ is a (per)fluoroalkylene radical, linear or branched, optionally containing one or more ether oxygen atoms, or a (per)fluoropolyoxyalkylene radical.

19 Claims, No Drawings

NEW FLUORINATED THERMOPLASTIC ELASTOMERS HAVING SUPERIOR MECHANICAL AND ELASTIC PROPERTIES, AND PREPARATION PROCESS THEREOF

The present invention relates to new fluorinated thermoplastic elastomers having superior mechanical and elastic properties, and to processes for preparing them.

As known, thermoplastic elastomers are block copolymers constituted by at least a "soft" segment having elastomeric properties and by at least a "hard" segment having plastomeric properties. Therefore, such products combine the typical properties of conventional vulcanized elastomers with those of plastomers. With respect to conventional elastomers, they do not require any curing process, hence they are easily processable and recyclable according to techniques usually employed for thermoplastic polymers, with evident economical and ecological advantages.

Fluorinated thermoplastic elastomers are known in the art. For instance, in U.S. Pat. No. 4,158,678, which is herein incorporated by reference, fluorinated block polymers, constituted by alternate hard and soft segments, at least one being fluorinated, are described. Such products are obtained by radical polymerization of fluorinated monomers in the presence of an iodinated chain transfer agents of formula $RI_n$, where R is a fluorinated radical, optionally containing chlorine, having from 1 to 8 carbon atoms, and n is 1 or 2. This process results in a first fluorinated polymer segment, with elastomeric or plastomeric properties depending on the monomer composition, having an iodine atom in one or both of the end groups. On such segment other fluorinated or non-fluorinated, segments are then grafted, taking advantage of the fact that the terminal iodine atoms are sensitive to radical attack and hence can cause a new polymer chain to grow. In that manner it is possible to obtain, for instance, fluorinated thermoplastic elastomers of the B-A-B type, where A is an elastomeric segment (for instance a tetrafluoroethylene/vinylidene fluoride/hexafluoropropene copolymer), while B is a plastomeric segment (for instance a homopolymer or copolymer deriving from tetrafluoroethylene and/or vinylidene fluoride). Other thermoplastic elastomers of this type are described in EP-444,700.

A shortcoming of such products is that mechanical and elastic properties quickly deteriorate when exposed to higher temperatures, and are quite unsatisfactory even at 50° C. In particular compression set values are high, such as to make the products unsuitable for manufacturing sealing elements (for instance shaft seals) to be used at high temperatures, as required by automotive, aerospace and the engineering industry.

The Applicant has now surprisingly found that it is possible to obtain new fluorinated thermoplastic elastomers having superior mechanical and elastic properties by introducing into the polymer chain small amounts of a fluorinated olefin containing a terminal iodine atom, whose structure is defined hereinunder.

Therefore, an object of the present invention is a fluorinated thermoplastic elastomer having a block structure constituted by at least a fluorinated polymer segment of type A having elastomeric properties and by at least a fluorinated polymer segment of type B having plastomeric properties, wherein at least one among the segments of type A or B comprises monomer units derived from at least an iodinated olefin having the formula:

$$CX_2=CX-R_f-CHR-I \quad (I)$$

wherein: 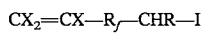

X is —H, —F, or —CH₃; R is —H or —CH₃; $R_f$ is a (per)fluoroalkylene radical, linear or branched, optionally containing one or more ether oxygen atoms, or a (per)fluoropolyoxyalkylene radical.

A further object of the present invention is a process for preparing the above defined fluorinated thermoplastic elastomers, which comprises in sequence:

(a) polymerizing at least a fluorinated olefin monomer, optionally in association with one or more non-fluorinated olefins, in the presence of a radical initiator and of an iodinated chain transfer agent, introducing as comonomer an iodinated olefin of formula (I) to obtain a pre-polymer constituted by a polymer segment of type A or B and containing iodine atoms in terminal position and/or in the chain;

(b) polymerizing at least a fluorinated olefin monomer, optionally in association with one or more non fluorinated olefins, in the presence of a radical initiator and of the pre-polymer obtained in step (a), so as to graft on said pre-polymer by means of the iodine atoms present in terminal position and/or in the chain at least a polymer segment of type B or A different from the pre-polymer.

A block polymer is thus obtained, made-up of two different types of segments, which still has iodine atoms in terminal position and/or in the chain, hence it can be utilized in a further polymerization step, so as to introduce in the structure other polymer segments different or the same as the previous ones, with the proviso that in any event blocks of type A (elastomeric) alternated to blocks of type B (plastomeric) shall be obtained (in this respect see what described in U.S. Pat. No. 4,158,678).

In a preferred embodiment, the fluorinated thermoplastic elastomer has structure of the type B-A-B, wherein the segment of type A is an elastomeric segment comprising monomer units derived from the iodinated olefin of formula (I), while B is a plastomeric segment.

Iodinated olefins according to formula (I) can be selected in particular from the following classes:

(1)

$$CHR=CH-Z-CH_2CHR-I \quad (II)$$

where: R is —H or —CH₃; Z is a linear or branched (per)fluoroalkylene radical $C_1-C_{18}$, optionally containing one or more ether oxygen atoms, or a (per)fluoropolyoxyalkylene radical;

(2)

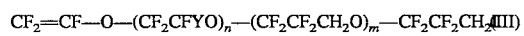

$$CF_2=CF-O-(CF_2CFYO)_n-(CF_2CF_2CH_2O)_m-CF_2CF_2CH_2I \quad (III)$$

wherein: Y is —F or —CF₃; m is an integer from 0 to 5; n is 0, 1 or 2.

As regards formula (II), Z is preferably a $C_4-C_{12}$ perfluoroalkylene radical, or a (per)fluoropolyoxyalkylene radical of formula:

$$-(Q)_p-CF_2O-(CF_2CF_2O)_m(CF_2O)_n-CF_2-(Q)_p- \quad (IV)$$

wherein: Q is a $C_1-C_6$, preferably $C_1-C_3$, alkylene or oxyalkylene radical; p is 0 or 1; m and n are numbers such that the m/n ratio is from 0.2 to 5 and the molecular weight of said (per)fluoropolyoxyalkylene radical is from 400 to 10,000, preferably from 500 to 1,000. Q is preferably selected from: —CH₂O—; —CH₂OCH₂—; —CH₂—; —CH₂CH₂—.

The olefins of formula (II) can be prepared starting from the compounds of formula I—Z—I according to the following process:

(1) adding ethylene or propylene to a compound of formula I—Z—I, thus obtaining a diiodinated product of formula:

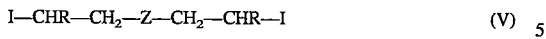

I—CHR—CH$_2$—Z—CH$_2$—CHR—I   (V)

where R and Z are defined as above;

(2) partially dehydroiodinating the product of formula (V) with a base (for instance NaOH, KOH, tertiary amines, etc.), so as to obtain the iodinated olefin of formula (II).

In step (1), the addition of ethylene or propylene is usually carried out in the presence of suitable catalysts, such as redox systems, for instance CuI or FeCl$_3$, in solution in an organic solvent, for instance acetonitrile. The addition reaction between a perfluoroalkyl iodide and an olefin is described, for instance, by M. Hudliky in "Chemistry of Organic Fluorine Compounds" (2nd Edition, Ellis Horwood Ltd., Chichester, 1976), and by R. E. Banks in "Organofluorine Chemicals and Their Industrial Applications" (Ellis Horwood Ltd, Chichester, 1979), or in J. Fluorine Chemistry, 49 (1990), 1–20, and in J. Fluorine Chemistry, 58 (1992), 1–8.

The dehydroiodination reaction of step (2) can be carried out either in the absence of solvent, or by dissolving the diiodinated product in a suitable solvent (for instance a glycol such as diethylenglycol, or a long chain alcohol). To maximize iodinated olefin yield, avoiding as far as possible a further dehydroiodination reaction with formation of the corresponding bis-olefin of formula CHR=CH—Z—CH=CHR, it is possible:

(a) to use the base in non-stoichiometric amounts, with a molar ratio base/diiodinated compound preferably from 1.5 to 0.5, and then separate the iodinated olefin from the bis-olefin by fractional distillation; or (b) to carry out the dehydroiodination reaction at reduced pressure, so as to remove the iodinated olefin from the reaction mixture as it forms, taking advantage of the fact that the latter has a boiling point lower than that of the starting diiodinated product; in such case the reaction is preferably carried out without any solvent.

Alternatively, it is possible to carry out step (1) in deficient amounts of ethylene or propylene, to favour as much as possible the formation of mono-addition product I—Z—CH$_2$—CHR—I (which can be separated from the di-addition product by fractional distillation); the mono-addition product is then dehydroiodinated as described above, with formation of the olefin I—Z—CH=CHR, which is finally subjected to a further addition of ethylene or propylene to give the iodinated olefin I—CHRCH$_2$—Z—CH=CHR.

When Z is a (per)fluoroalkylene radical, optionally containing one or more ether oxygen atoms, the starting diiodinated compound I—Z—I can be obtained, by telomerization of a C$_2$–C$_4$ (per)fluoroolefin or of a C$_3$–C$_8$ (per)fluorovinylether (for instance tetrafluoroethylene, perfluoropropene, vinylidenfluoride, perfluoromethylvinylether, perfluoropropylvinylether, or mixtures thereof), using a product of formula I—(R$_f$)$_k$—I (where k=0, 1; R$_f$=C$_1$–C$_8$ (per)fluoroalkylene radical) as telogenic agent. Telomerization reactions of this type are described, for instance, by C. Tonelli and V. Tortelli in J. Fluorine Chem., 47 (1990), 199, or also in EP-200,908.

When Z is a (per)fluoropolyoxyalkylene radical, the preparation of the products I—Z—I is described, for instance, in U.S. Pat. No. 3,810,874.

The iodinated olefins of formula (III) and the preparation process thereof are described in EP-199,138, which is herein incorporated by reference. Examples of olefins of formula (III) are: CF$_2$=CF—OCF$_2$CF$_2$CH$_2$I ; CF$_2$=CF—OCF$_2$CF(CF$_3$)OCF$_2$CF$_2$CH$_2$I; etc.

The amount of units deriving from iodinated olefins of formula (I) in each polymer segment is generally from 0.01 to 1.0 moles, preferably from 0.03 to 0.5 moles, even more preferably from 0.05 to 0.2 moles per 100 moles of the other basic monomeric units forming the polymer segment itself.

By fluorinated olefinic monomers it is meant all the fluorinated products having at least a double bond C=C, optionally containing hydrogen and/or chlorine and/or bromine and/or oxygen, capable of forming (co)polymers in the presence of radical initiators. Among them we can cite: C$_2$–C$_8$ perfluoroolefins, such as tetrafluoroethylene (TFE), hexafluoropropene (HFP), hexafluoroisobutene; C$_2$–C$_8$ hydrogenated fluoroolefins, such as vinylfluoride (VF), vinylidenefluoride (VDF), trifluoroethylene, perfluoroalkylethylene CH$_2$=CH—R$_f$, where R$_f$ is a C$_1$–C$_6$ perfluoroalkyl; C$_2$–C$_8$ chloro- and/or bromo-fluoroolefins, such as chlorotrifluoroethylene (CTFE) and bromotrifluoroethylene; (per)fluoroalkylvinylethers (PAVE) CF$_2$=CFOR$_f$, where R$_f$ is a C$_1$–C$_6$ (per)fluoroalkyl, for instance trifluoromethyl, bromodifluoromethyl or pentafluoropropyl; (per)fluorooxyalkylvinylethers CF$_2$=CFOX, where X is a C$_1$–C$_{12}$ (per)fluorooxyalkyl having one or more ether groups, for instance perfluoro-2-propoxy-propyl or perfluorodioxols.

Such fluorinated olefin monomers can be also copolymerized with C$_2$–C$_8$ non-fluorinated olefins, such as ethylene, propylene or isobutylene.

The segments of type A (elastomeric) can in particular be selected from the following classes (composition expressed as % by moles):

(1) VDF-based copolymers, where VDF is copolymerized with at least a comonomer selected from: C$_2$–C$_8$ perfluoroolefins; C$_2$–C$_8$ chloro- and/or bromo-fluoroolefins; (per)fluoroalkylvinylethers (PAVE) or (per)fluorooxyalkylvinylethers as defined above; C$_2$–C$_8$ non-fluorinated olefins (Ol); typical compositions are the following: (a) VDF 45–85%, HFP 15–45%, TFE 0–30%, (b) VDF 50–80%, PAVE 5–50%, TFE 0–20%; (c) VDF 20–30%, Ol 10–30%, HFP and/or PAVE 18–27%, or TFE 10–30%;

(2) TFE-based copolymers, where TFE is copolymerized with at least a comonomer selected from: (per)fluoroalkylvinylethers (PAVE) or (per)fluoro-oxyalkylvinylethers as defined above; C$_2$–C$_8$ hydrogenated fluoroolefins; C$_2$–C$_8$ fluoroolefins containing chlorine and/or bromine atoms; C$_2$–C$_8$ non-fluorinated olefins (Ol); typical compositions are the following: (d) TFE 50–80%, PAVE 20–50%; (e) TFE 45–65%, Ol 20–55%, VDF 0–30%; (f) TFE 32–60%, Ol 10–40%, PAVE 20–40%; (g) TFE 33–75%, PAVE 15–45%, or VDF 10–22%.

The segments of type B (plastomeric) can be selected in particular from the following classes (compositions expressed as % by moles):

(1) polytetrafluoroethylene or modified polytetrafluoroethylene containing small amounts, generally from 0.1 to 3%, preferably lower than 0.5%, of one or more comonomers such as, for instance: HFP, PAVE, VDF, hexafluoroisobutene, CTFE, or perfluoroalkylethylenes;

(2) TFE thermoplastic polymers containing from 0.5 to 8% of at least a PAVE, such as, for instance, copolymers of TFE and perfluoropropylvinylether and/or perfluoromethylvinylether, or also TFE/perfluoroalkylethylene copolymers;

(3) TFE thermoplastic polymers containing from 2 to 20% of a C$_3$–C$_8$ perfluoroolefin, such as, for instance, FEP (TFE/HFP copolymer), to which other comonomers having vinylether structure CF$_2$=CF—OR$_f$ or CF$_2$=CF—OX, as defined above, can be added in small amounts (lower than 5%);

(4) copolymers of TFE or CTFE (40–60%) with ethylene, propylene or isobutylene (40–60%), optionally containing as a third comonomer a $C_3$–$C_8$ (per)fluoroolefin or a PAVE, in amounts from 0.1 to 10%;

(5) polyvinylidenefluoride or modified polyvinylidenefluoride containing small amounts, generally from 0.1 to 10%, of one or more fluorinated comonomers, such as hexafluoropropene, tetrafluoroethylene or trifluoroethylene.

The thermoplastic polymers of the classes indicated above, and in particular the TFE-based polymers, can be modified with perfluorinated dioxols, as described for instance in U.S. Pat. No. 3,865,845, U.S. Pat. No. 3,978,030, EP-73,087, EP-76,581, and EP-80,187.

The process for preparing the fluorinated thermoplastic elastomers of the present invention is preferably carried out in an aqueous emulsion according to methods well known in the art, in the presence of a suitable radical initiator. The latter can be selected for instance from: inorganic peroxides (for instance alkali metal or ammonium persulphates, perphosphates, perborates or percarbonates), optionally in combination with ferrous, cuprous or silver salts or other easily oxidable metals; organic peroxides (for instance, disuccinylperoxide, tertbutyl-hydroperoxide, and ditertbutylperoxide); and azocompounds (see U.S. Pat. No. 2,515,628 and U.S. Pat. No. 2,520,338). It is also possible to use organic or inorganic redox systems, such as persulphate ammonium/sodium sulphite, hydrogen peroxide/aminoiminomethansulphinic acid.

In the reaction medium are usually present also surfactants of various types, among which particularly preferred are the fluorinated surfactants of formula:

wherein $R_f$ is a $C_5$–$C_{16}$ (per)fluoroalkyl or a (per)fluoropolyoxyalkylene chain, $X^-$ is —COO$^-$ or —SO$_3^-$, $M^+$ is selected from: $H^+$, $NH_4^+$, or an alkali metal ion. Among the most commonly used, we can cite: ammonium perfluorooctanoate, (per)fluoropolyoxyalkylenes terminated with one or more carboxyl groups, etc.

During step (a) of the process, iodinated chain transfer agents of formula $R_fI_n$ are added to the reaction medium, wherein $R_f$ is a (per)fluoroalkyl or a (per)fluorochloroalkyl having from 1 to 16 carbon atoms, preferably from 1 to 8 carbon atoms, whereas n is 1 or 2. It is also possible to use as chain transfer agents alkali or alkaline-earth metal iodides, as described in U.S. Pat. No. 5,173,553. The amount of chain transfer agent to be added is established depending on the molecular weight which is intended to be obtained and on the effectiveness of the chain transfer agent itself.

The amount of iodinated olefin of formula (I) to be added to the reaction medium depends on the amount of units deriving therefrom which are intended to be obtained in the final product, bearing in mind that at the low amounts employed according to the purposes of the present invention, practically all the iodinated olefin present in the reaction medium enters the chain.

When step (a) is terminated, the reaction is discontinued, for instance by cooling, and the residual monomers are removed, for instance by heating the emulsion under stirring. The second polymerization is then carried out, feeding the new monomer mixture and adding fresh radical initiator. If necessary, during this second step, further chain transfer agent is added, which can be selected from the same iodinated products described above, or from transfer agents known in the art for fluorinated polymers, such as for instance: ketones, esters or aliphatic alcohols having from 3 to 10 carbon atoms, such as acetone, ethylacetate, diethylmalonate, diethylether, isopropyl alcohol, etc.; hydrocarbons, such as methane, ethane, butane, etc.; chloro (fluoro) carbons, optionally containing hydrogen, such as chloroform, trichlorofluoromethane, etc.; bis(alkyl)carbonates wherein the alkyl has from 1 to 5 carbon atoms, such as bis(ethyl) carbonate, bis(isobutyl) carbonate, etc.

When the process is terminated, the thermoplastic elastomer is isolated from the emulsion according to conventional methods, such as by coagulation by addition of electrolytes or by cooling.

Alternatively, the polymerization reaction can be carried out in mass or in suspension, in an organic liquid where a suitable radical initiator is present, according to known techniques.

The polymerization temperature and pressure can vary within wide ranges depending on the type of monomers used and based on the other reaction conditions. It is generally operated at a temperature of from −20° to +150° C., with pressures up to 10 MPa.

The process for preparing the thermoplastic elastomers of the present invention is preferably carried out in aqueous emulsion in the presence of a microemulsion of perfluoropolyoxyalkylenes, as described in U.S. Pat. No. 4,864,006, or in the presence of a microemulsion of fluoropolyoxyalkylenes having hydrogenated end groups and/or hydrogenated repetitive units, as described in EP-625,526.

The present invention will be now better illustrated by the following working examples, which are presented for illustration but do not limit the scope of the invention.

EXAMPLE 1

Preparation of $CH_2$=CH—$(CF_2CF_2)_3$—$CH_2CH_2I$

(1) Ethylene addition

In a 5 l AISI 316 steel reactor, equipped with a magnetic stirrer, previously evacuated and then brought to nitrogen atmosphere, were loaded: 1200 g (2.17 moles) of I—$(CF_2CF_2)_3$—I (prepared as described in J. Fluorine Chemistry, 47 (1990), 199); 12.4 g of CuI; 2.2 l of acetonitrile. The reactor was then pressurized with 5.0 moles of ethylene, and brought to a temperature of 160° C., and kept at such temperature for 10 hours under stirring. The pressure reached a maximum of 51 atm and then gradually decreased to 10 atm. The reactor was then cooled down to room temperature, and the unreacted ethylene was vented. The reaction mixture, containing sediments, was discharged and, after pre-stirring with excess of water, filtered on a buchner at reduced pressure, and washed with water. The collected solid was dried in an oven at 110° C. 1300 g of product were so obtained, which at gas chromatographic analysis showed a sole peak (yield: 98%). $^{19}$F-NMR and $^1$H-NMR analysis gave the following results:

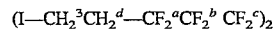

| $^{19}$F-NMR (CDCl$_3$) | a = −114.5 ppm; b = −123 ppm; c = −121 ppm; a/b/c = 1/1/1 |
|---|---|
| $^1$H-NMR | e = 2.7–3.0 ppm; d = 3.4 ppm; e/d = 1/1. |

(2) Dehydroiodination

In a 500 ml glass reactor, equipped with a mechanical stirrer, a thermometer, a dropping funnel with compensator, a water-cooled claisen with a gathering flask kept at −15° C. (cold trap) were loaded: 80 g (0.131 moles) of I—$CH_2CH_2(CF_2CF_2)_3$—$CH_2CH_2I$ and 80 ml of diethylenglycol. The pressure in the system was reduced to 50 mmHg by means of a mechanical pump and the temperature brought to 130° C. by immersion in an oil bath. A solution consisting of 15 g of NaOH dissolved in 50 ml of $H_2O$ was then gradually added (in about 30 min). Development of vapours, which condensed in the cold trap, revealed immediately that the reaction took place. At the end of the reaction, two phases were present in the cold trap, which were separated in a separating funnel. The aqueous phase was extracted with methylene chloride, which was then removed by distillation at reduced pressure. The so obtained organic phase and that left in the reactor were put together to give a total of 52.3 g of reaction products. By means of gas chromatography analysis, the mixture resulted to be formed by:

| | |
|---|---|
| $CH_2$=CH—$(CF_2CF_2)_3$—CH=$CH_2$ | 54% by weight |
| I—$CH_2CH_2$—$(CF_2CF_2)_3$—CH=$CH_2$ | 40% by weight |
| I—$CH_2CH_2$—$(CF_2CF_2)_3$—$CH_2CH_2$—I | 6% by weight |

After fractional distillation, 20.3 g of iodinated olefin I—$CH_2CH_2$—$(CF_2CF_2)_3$—CH=$CH_2$ (purity: 99%; yield: 32%) were obtained.

Polymerization Reaction

In a 5 l autoclave equipped with a stirrer working at 630 rpm, were charged, after evacuation, 3.5 l of demineralized water and 36 ml of a microemulsion obtained by mixing:

7.8 ml of an acid terminated perfluoropolyoxyalkylene of formula:

$$CF_3O(CF_2—CF(CF_3)O)_n(CF_2O)_mCF_2COOH$$

where n/m=10, having average molecular weight of 600;

7.8 ml of a 30% by volume $NH_4OH$ aqueous solution;

15.6 ml of demineralized water;

4.8 ml of Galden® D02 of formula:

$$CF_3O(CF_2—CF(CF_3)O)_n(CF_2O)_mCF_3$$

wherein n/m=20, having average molecular weight of 450.

The autoclave was then brought to 80° C. and kept at such temperature for the whole duration of the reaction. The following monomer mixture was then fed:

| | |
|---|---|
| VDF | 24.0% by moles |
| HFP | 59.5% by moles |
| TFE | 16.5% by moles | so as to bring the pressure to 25 bar.

In the autoclave were then introduced:

112 ml of a persulphate ammonium (APS) aqueous solution having a concentration of 1 g/l;

1,6-diiodoperfluorohexane ($C_6F_{12}I_2$) as chain transfer agent, in the form of a solution obtained dissolving 6.0 ml of the iodinated product in 14.0 ml of the same Galden® D02 used for the microemulsion;

the iodinated olefin of formula $CH_2$=CH—$(CF_2CF_2)_3$—$CH_2$—$CH_2I$, in the form of a solution obtained dissolving 3.0 ml in 47.0 ml of the same Galden® D02 described above; the addition was carried out in 20 portions, each portion of 2.5 ml, at the polymerization start and at each 5% increase in monomer conversion.

The 25 bar pressure was kept constant for the whole duration of the polymerization feeding a mixture constituted by:

| | |
|---|---|
| VDF | 50% by moles |
| HFP | 26% by moles |
| TFE | 24% by moles. |

After 300 minutes of reaction, the reaction was discontinued by cooling the reactor down to room temperature. 1500 g of pre-polymer, of which 300 g were drained from the reactor, were so obtained. The remaining latex was heated to 95° C. for 30 minutes under stirring at 100 rpm. The residual pressure was then vented and the temperature brought to 80° C. The latex was then drained and fed, together with 3 l of demineralized water, in a 10 l autoclave equipped with a stirrer working at 545 rpm. VDF was then fed into said autoclave up to a pressure of 30 bar, and 100 ml of an APS solution having a 0.5 g/l concentration were then added. The polymerization was carried out for 180 minutes until a conversion of 300 g of VDF was obtained. The autoclave was then cooled, the latex discharged and the polymer coagulated by addition of an aluminum sulphate solution (6 g of sulphate per liter of latex). After washing, the so obtained product was dried in an oven for 24 hours at 70° C. and then characterized as reported in Table 1. The polymer monomer composition was determined by $^{19}$F-NMR analysis.

EXAMPLE 2 (comparative)

Following the same procedure as described in Example 1, a polymer of the same type but without the iodinated olefin was prepared. The properties of the product are reported in Table 1.

TABLE 1

| POLYMER PROPERTIES | EX. 1 | | EX. 2(*) | |
|---|---|---|---|---|
| Composition (% moles) | soft/ | hard | soft/ | hard |
| VDF | 53.9 | 100 | 56.4 | 100 |
| HFP | 20.3 | — | 19.2 | — |
| TFE | 25.9 | — | 24.5 | — |
| iodinated olefin | 0.06 | — | — | — |
| $T_g$ (°C.) | −12.2 | | −13.9 | |
| $T_m$ (°C.) | 165.9 | | 165.0 | |
| $\Delta H_m$ (cal/g) | 3.6 | | 3.3 | |
| (ASTM D3418-82 - DSC) | | | | |
| Mechanical properties after press at | | | | |
| 180° C. for 5 min (ASTM D412-83) | | | | |
| Modulus at 100% (MPa) | 5.9 | | 3.2 | |
| Stress at break (MPa) | 11.0 | | 4.8 | |
| Elongation at break (%) | 313 | | 367 | |
| Hardness Shore A (points) | 77 | | 73 | |
| Compression set (ASTM D395 Method B) | | | | |
| at 120° C. for 24 hours (%) | 53 | | — | |
| at 100° C. for 24 hours (%) | 49 | | 73 | |

(*)comparative

We claim:

1. A fluorinated thermoplastic elastomer having a block structure constituted by at least a fluorinated polymer segment having elastomeric properties and by at least a fluorinated polymer segment having plastomeric properties, wherein at least one segment comprises monomer units derived from an iodinated olefin having the formula:

$$CX_2=CX-R_f CHR-I \quad (I)$$

wherein:
X is selected from the group consisting of —H, —F, and —CH$_3$; R is —H or —CH$_3$; R$_f$ is selected from the group consisting of a (per)fluoroalkylene radical, linear or branched, optionally containing one or more ether oxygen atoms, and a (per)fluoropolyoxyalkylene radical.

2. Thermoplastic elastomer according to claim 1, wherein the iodinated olefin has the formula:

$$CHR=CH-Z-CH_2CHR-I \quad (II)$$

wherein R is selected from the group consisting of —H and —CH$_3$; Z is selected from the group consisting of a C$_1$–C$_{18}$ linear or branched (per)fluoroalkylene radical, optionally containing one or more ether oxygen atoms, and a (per)fluoropolyoxyalkylene radical.

3. Thermoplastic elastomer according to claim 2, wherein in formula (II) Z is C$_4$–C$_{12}$ perfluoroalkylene radical.

4. Thermoplastic elastomer according to claim 2, wherein in formula (II) Z is a (per)fluoropolyoxyalkylene radical of formula:

$$-(Q)_p-CF_2O-(CF_2CF_2O)_m(CF_2O)_n-CF_2-(Q)_p- \quad (IV)$$

wherin: Q is a C$_1$–C$_6$ alkylene or oxyalkylene radical; p is 0 or 1; m and n are numbers such that the ratio m/n is from 0.2 to 5 and the molecular weight of said (per)fluoropolyoxyalkylene radical is from 400 to 10,000.

5. Thermoplastic elastomer according to claim 4, wherein Q is selected from the group consisting of —CH$_2$O—; —CH$_2$OCH$_2$—; —CH$_2$— and —CH$_2$CH$_2$—.

6. Thermoplastic elastomer according to claim 1, wherein the iodinated olefin has the formula:

$$CF_2=CF-O-(CF_2CFYO)_n-(CF_2CF_2CH_2O)_m-CF_2CF_2CH_2I \quad (III)$$

wherein: Y is —F or CF$_3$; m is an integer from 0 to 5; n is 0, 1 or 2.

7. Thermoplastic elastomer according to claim 1, wherein the amount of units deriving from the iodinated olefin in each polymer segment is from 0.01 to 1.0% by mole, calculated with respect to the total amount of the other monomers constituting the polymer segment.

8. Thermoplastic elastomer according to claim 7, wherein the amount of units deriving from the iodinated olefin in each polymer segment is from 0.03 to 0.5% by mole, calculated with respect to the total amount of the other monomers constituting the polymer segment.

9. Thermoplastic elastomer according to claim 1, wherein the elastomeric segment is a vinylidenefluoride-based co-polymer.

10. Thermoplastic elastomer according to claim 9, wherein the elastomeric segment is a copolymer of vinylidenefluoride with at least a comonomer selected from the group consisting of: C$_2$–C$_8$ perfluoroolefins; C$_2$–C$_8$ chloro- and/or bromofluoroolefins; (per)fluoroalkylvinylethers (PAVE) CF$_2$=CFOR$_f$, where R$_f$ is a C$_1$–C$_6$ (per)fluoroalkyl; (per)fluoro-oxyalkylvinylethers CF$_2$=CFOX, where X is a C$_1$–C$_{12}$ (per)fluoro-oxyalkyl having one or more ether groups; and C$_2$–C$_8$ non-fluorinated olefins (Ol).

11. Thermoplastic elastomer according to claim 10, wherein the composition of the VDF-based copolymer is selected from the group consisting of (a) VDF 45–85 %, HFP 15–45 % and TFE 0–30%; (b) VDF 50–80%, PAVE 5–50% and TFE 0–20%; and (c) VDF 20–30%, Ol 10–30%, HFP and/or PAVE 18–27% and TFE 10–30%.

12. Thermoplastic elastomer according to claim 1, wherein the elastomeric segments are based on tetrafluoroethylene (TFE).

13. Thermoplastic elastomer according to claim 12, wherein the elastomeric segments are based on the TFE copolymerized with at least a comonomer selected from the group consisting of: (per)fluoroalkylvinylethers (PAVE) CF$_2$=CFOR$_f$, where R$_f$ is a C$_1$–C$_6$ (per)fluoroalkyl; perfluoro-oxyalkylvinylethers CF$_2$=CFOX, where X is a C$_1$–C$_{12}$ (per)fluoro-oxyalkyl having one or more ether groups; C$_2$–C$_8$ hydrogenated fluoroolefins; C$_2$–C$_8$ fluoroolefins containing chlorine and/or bromine atoms; and C$_2$–C$_8$ non-fluorinated olefins (Ol).

14. Thermoplastic elastomer according to claim 13, wherein the composition of the VDF-based copolymer is selected from the group consisting of (d) TFE 50–80% and PAVE 20–50%; (e) TFE 45–65%, Ol 20–55 %, and VDF 0–30%; (f) TFE 32–60%, Ol 10–40%, and PAVE 20–40% and (g) TFE 33–75%, PAVE 15–45% and VDF 10–22%.

15. Thermoplastic elastomer according to claim 1, wherein the plastomeric segments are selected from the following classes (compositions expressed as % by moles):

(1) polytetrafluoroethylene or modified polytetrafluoroethylene containing from 0.1 to 3 % of one or more comonomers selected from the group consisting of: hexafluoropropene (HFP), perfluoroalkylvinylethers (PAVE), vinylidenefluoride (VDF), hexafluoroisobutene, chlorotrifluoroethylene (CTFE), and perfluoroalkylethylenes;

(2) TFE thermoplastic polymers containing from 0.5 to 8% of at least a PAVE;

(3) TFE thermoplastic polymers containing from 2 to 20% of a C$_3$–C$_8$ perfluoroolefin, optionally containing even up to 5 % of other comonomers having the vinylether structure CF$_2$=CF—OR$_f$ or CF$_2$=CF—OX, as above defined;

(4) copolymers of TFE or CTFE (40–60%) with ethylene, propylene or isobutylene (40–60%), optionally containing as a third comonomer a (per)fluoroolefin C$_3$–C$_8$ or a PAVE, in an amount from 0.1 to 10%; and (5) polyvinylidenefluoride or modified polyvinylidenefluoride containing from 0.1 to 10% of one or more fluorinated comonomers selected from the group consisting of hexafluoropropene, tetrafluorethylene, and trifluoroethylene.

16. Process for preparing a fluorinated thermoplastic elastomer according to claim 1, which comprises in sequence:

(a) polymerizing at least a fluorinated olefinic monomer, optionally in association with one or more non-fluorinated olefins, in the presence of a radical initiator and of a iodinated chain transfer agent, introducing as comonomer an iodinated olefin of formula (I) to obtain a pre-polymer constituted by a polymer segment of type A or B and containing iodine atoms in terminal position and/or in the chain;

(b) polymerizing at least a fluorinated olefin monomer, optionally in association with one or more non-fluorinated olefins, in the presence of a radical initiator and of the pre-polymer obtained in step (a), so as to graft on said pre-polymer by means of the iodine atoms present in terminal position and/or in the chain at least a polymer segment of type B or A different from the pre-polymer.

17. Process according to claim 16, wherein the block polymer obtained in step (b) is used in further polymerization steps, to introduce in the structure other polymer segments different or the same as previous ones, with the proviso that the elastomeric block alternates with the plastomeric blocks.

18. Process according to claim 17, wherein in step (a) an iodinated chain transfer agent of formula $R_f I_n$ is added, wherein: $R_f$ is a (per)fluoroalkyl or a (per)fluorochloroalkyl having from 1 to 16 carbon atoms; n is 1 or 2.

19. Process according to claim 16, wherein the monomers are polymerized in aqueous emulsion in the presence of a microemulsion of perfluoropolyoxyalkylenes or fluoropolyoxyalkylenes having hydrogenated end groups and/or hydrogenated repetitive units.

* * * * *